(12) United States Patent
Balbo Block et al.

(10) Patent No.: US 8,759,411 B2
(45) Date of Patent: Jun. 24, 2014

(54) DERIVATIVES OF DIPHOSPHINES AS FLAME RETARDANTS FOR POLYURETHANES

(75) Inventors: Marco Balbo Block, Osnabrueck (DE); Jens Ferbitz, Osnabrueck (DE); Oliver Steffen Henze, Damme (DE); Christoph Fleckenstein, Freigericht (DE); Klemens Massonne, Bad Duerkheim (DE)

(73) Assignee: BASF SE, Ludwigshafen (DE)

( * ) Notice: Subject to any disclaimer, the term of this patent is extended or adjusted under 35 U.S.C. 154(b) by 276 days.

(21) Appl. No.: 13/017,608

(22) Filed: Jan. 31, 2011

(65) Prior Publication Data

US 2011/0190407 A1    Aug. 4, 2011

Related U.S. Application Data

(60) Provisional application No. 61/300,052, filed on Feb. 1, 2010.

(51) Int. Cl.
*C08G 18/06* (2006.01)
*C08J 9/04* (2006.01)

(52) U.S. Cl.
USPC ........... 521/107; 521/106; 521/108; 521/121; 521/168; 521/169; 521/170; 524/122; 528/51; 528/72

(58) Field of Classification Search
CPC .. C08G 18/14; C08G 18/3855; C08G 18/388; C08G 18/836; C08G 71/04; C08G 2101/0008; C08G 2101/0025; C08J 9/0023; C08J 9/0033; C08J 9/0038; C08J 2375/04; C08K 5/49; C08K 5/52; C08L 75/04
USPC ......... 521/106, 107, 108, 168, 169, 121, 170; 528/51, 72; 524/122
See application file for complete search history.

(56) References Cited

U.S. PATENT DOCUMENTS

| | | | | |
|---|---|---|---|---|
| 3,065,273 | A | * | 11/1962 | Meinhardt ................... 568/15 |
| 3,957,720 | A | | 5/1976 | Maier |
| 4,111,899 | A | * | 9/1978 | Baggett et al. ............... 524/120 |
| 4,210,630 | A | | 7/1980 | Dany et al. |
| 4,430,453 | A | * | 2/1984 | Seifert et al. ................ 521/107 |
| 5,436,280 | A | | 7/1995 | Medsker, II et al. |
| 5,811,470 | A | * | 9/1998 | Prindle et al. ............... 521/85 |
| 2002/0169224 | A1 | * | 11/2002 | Gehlsen et al. .............. 521/50 |
| 2004/0249022 | A1 | | 12/2004 | Su |
| 2006/0020064 | A1 | | 1/2006 | Bauer et al. |
| 2008/0255278 | A1 | | 10/2008 | Futterer et al. |
| 2009/0326108 | A1 | | 12/2009 | Kim et al. |
| 2010/0093239 | A1 | | 4/2010 | Bauer et al. |
| 2012/0178842 | A1 | * | 7/2012 | Hahn et al. ................ 521/155 |

FOREIGN PATENT DOCUMENTS

| | | |
|---|---|---|
| DE | 1 111 394 | 7/1961 |
| DE | 1 152 536 | 8/1963 |
| DE | 1 152 537 | 8/1963 |
| DE | 1 222 669 | 8/1966 |
| DE | 103 17 487 A1 | 1/2004 |
| DE | 10 2004 050 479 A1 | 4/2006 |
| DE | 10 2006 048 698 A1 | 4/2008 |
| EP | 1 624 015 A1 | 2/2006 |
| JP | 2004-75729 | 3/2004 |
| WO | WO 2009/086035 A1 | 7/2009 |

OTHER PUBLICATIONS

International Search Report issued Mar. 11, 2011, in Patent Application No. PCT/EP2011/051110.

* cited by examiner

*Primary Examiner* — John Cooney
(74) *Attorney, Agent, or Firm* — Oblon, Spivak, McClelland, Maier & Neustadt, L.L.P.

(57) ABSTRACT

The use of at least one diphosphine of formula (I),

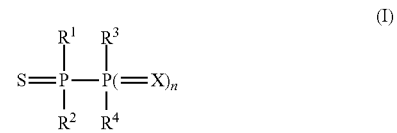

wherein
X is S or O;
n is 0 or 1;
$R^1$, $R^2$, $R^3$, $R^4$ are independently $C_1$-$C_{10}$-alkyl, $C_1$-$C_{10}$-hydroxyalkyl, $C_1$-$C_{10}$-alkoxy, $C_1$-$C_{10}$-hydroxyalkoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_4$-alkyl, $C_6$-$C_{10}$-aryl-$C_1$-$C_4$-alkoxy, $C_6$-$C_{10}$-hydroxy-aryl, $C_6$-$C_{10}$-hydroxyaryloxy, $C_1$-$C_{10}$-thioalkyl, $C_6$-$C_{10}$-thioaryl or $C_1$-$C_4$-thioalkyl-$C_6$-$C_{10}$-aryl, $NR^5R^6$, $COR^2$, $COOR^5$ or $CONR^5R^6$;
$R^5$, $R^6$ are H, $C_1$-$C_{10}$-alkyl, $C_3$-$C_{10}$-cycloalkyl, $C_6$-$C_{10}$-aryl or $C_6$-$C_{10}$-aryl-$C_1$-$C_4$-alkyl;
as a flame retardant in a polyurethane material is provided.

33 Claims, No Drawings

DERIVATIVES OF DIPHOSPHINES AS FLAME RETARDANTS FOR POLYURETHANES

The invention relates to the use of specific diphosphines as flame retardants for polyurethanes (PU) and to a method for reducing the flammability of polyurethanes by incorporating into the polymers these specific of diphosphines. Moreover, the invention is related to a polyurethane material comprising at least one diphosphine of the invention.

Flame resistance is a significant property for organic materials, such as wood, primarily timber, paper, paperboard, textiles, flammable performance liquids and in particular polymeric materials. In some applications, flame resistance is given first priority due to the danger to human beings and material assets, for example in structural materials for airplane and motor vehicle construction and for public transportation vehicles. In electronic applications, flame resistance is necessary because the components may generate localized high temperatures. Therefore, a high level of flame/fire protection is warranted.

Accordingly, it has been customary to incorporate into organic materials and in particular into polymeric materials flame retardants.

The flame retardant market today is comprised of products which function to interfere with the combustion process by chemical and/or physical means. Mechanistically, these flame retardants have been proposed to function during combustion of an article either in the gas phase, the condensed phase or both.

The most common flame retardants thus far used commercially have been halogen containing compounds such as tetrabromobisphenol A, decabromodiphenyl oxide, decabromodiphenyl ethane, brominated carbonate oligomers, brominated epoxy oligomers, poly(bromostyrenes) and especially for PU rigid foams brominated ethers like Ixol B 251 or brominated alcohols like PHT-4-diol. In flexible polyurethane foams chlorinated compounds like tris(chloro-isopropyl) phosphate are most widely used. The organohalogens are proposed to generate halogen species which interfere in the gas phase with free radical organic "fuel" from the polymer substrate.

Generally, halogen containing fire retardants such as those listed above are considered to be safe and effective. However, there has been increasing interest to utilize halogen-free flame retarding substances. It is desirable for the materials equipped with these compounds to be able to meet the requirements of fire retardancy and to display the same or better properties, such as mechanical resistance, toughness, solvent and moisture resistance, etc. that is offered with the halogenated materials currently used. Many different approaches have been investigated to flame retard organic polymers without the use of halogens (for recent reviews see: Journal of Fire Sciences 24, 345-364, 2006; Journal of Fire Sciences 22, 251-264, 2004; Polymer International 54, 11-35, 2005; Polymer International 54, 981-998, 2005).

Known halogen-free phosphorous-based flame retardants suitable for PU are for example triethylphosphate (TEP), diethyl ethyl phosphonate (DEEP), triphenylphosphate (TPP) and others. They are less effective as flame retardants than halogenated phosphates or deteriorate the material's properties due to their plasticising or cell-opening effects. Another approach to enhance flame retardance is to add inorganic flame retardants. They are either less effective in polyurethanes and have to be used in large amounts and/or they lead to negative consequences on the mechanical properties and/or the processing. Fillers sometimes used include melamine, melamine cyanurate, ammonium polyphosphate, expandable graphite, calcium carbonate, magnesium carbonate, zinc borate, silicates, silicones, glass fibres, glass bulbs, asbestos, kaolin, mica, barium sulfate, calcium sulfate, metal oxides, hydrates and hydroxides such as zinc oxide, magnesium hydroxide, aluminium trihydrate, silica, calcium silicate and magnesium silicate.

JP-A 2004-075729 discloses the use of diphosphine mono- and dioxides as flame retardants for polymers. Thermosetting polyurethanes are mentioned in a long list of possible polymers but no examples are given.

U.S. Pat. No. 3,957,720 discloses disphosphine disulfides with cyclic ligands as flame retardants for polyamides, polyesters and polyolefins. No conclusions as to the suitability of these compounds as flame retardants for other specific polymers can be drawn from this document.

U.S. Pat. No. 5,436,280 discloses diphosphine oxides and sulfides as chain transfer agents in the polymerization of vinyl polymers. Flame retarding properties are mentioned, but the final polymers do not contain any diphosphines.

It is an object of the present invention to provide halogen-free flame retardants which can be applied in PU which are effective and economic and which do not show the disadvantages of the known systems.

It has been found that specific derivatives of diphosphines impart good flame retarding properties to PU equipped therewith.

In one aspect of the invention there is provided the use of at least one diphosphine of formula (I),

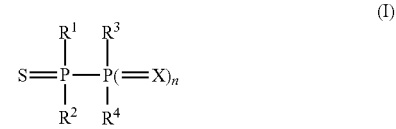

wherein
X is S or O;
n is 0 or 1;
$R^1$, $R^2$, $R^3$, $R^4$ are independently $C_1$-$C_{10}$-alkyl, $C_1$-$C_{10}$-hydroxyalkyl, $C_1$-$C_{10}$-alkoxy, $C_1$-$C_{10}$-hydroxyalkoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_4$-alkyl, $C_6$-$C_{10}$-aryl-$C_1$-$C_4$-alkoxy, $C_6$-$C_{10}$-hydroxy-aryl, $C_6$-$C_{10}$-hydroxy-aryloxy, $C_1$-$C_{10}$-thioalkyl, $C_6$-$C_{10}$-thioaryl, $C_1$-$C_4$-thioalkyl-$C_6$-$C_{10}$-aryl, $NR^5R^6$, $COR^2$, $COOR^5$ or $CONR^5R^6$;
$R^5$, $R^6$ are H, $C_1$-$C_{10}$-alkyl, $C_3$-$C_{10}$-cycloalkyl, $C_6$-$C_{10}$-aryl or $C_6$-$C_{10}$-aryl-$C_1$-$C_4$-alkyl;
as a flame retardant in a polyurethane material.

In a further aspect of the invention there is provided a method for enhancing the flame retardance of a polyurethane material, comprising the step of incorporating into the polyurethane material at least one diphosphine compound of formula (I) above.

In yet a further aspect of the invention there is provided a polyurethane material, comprising
a) a polyurethane component, and
b) at least one diphosphine compound of formula (I).

Polyurethane materials according to the invention show excellent flame retardance even without the use of halogenated substances—as evidenced by the tests in the example section. The diphosphine additives of the invention do not adversely affect the mechanical and physical properties of the polyurethane material. They have high boiling or decomposition temperatures and, thus, show low emissions from the polyurethane material and effect flame protecting properties at the decomposition temperature of the polymer. In addition, the diphosphines of the invention do not interfere with the polymerization reaction and the foaming process and can, therefore, advantageously be added at this stage leading to a homogeneous distribution in the final product.

As used herein, the term "flame retardants" is understood to mean substances which reduce the flammability of substrates which are equipped with them. They are active during the starting phase of a fire by enhancing the resistance of the flame-retarded material to decomposition by thermal stress and/or by preventing the spread of a source of ignition to the flame-retarded material, thus preventing, delaying or inhibiting the spread of a fire.

The diphosphine compounds of the invention (I) are diphosphines of formulae (II) to (IV) or mixtures of two or more of those compounds

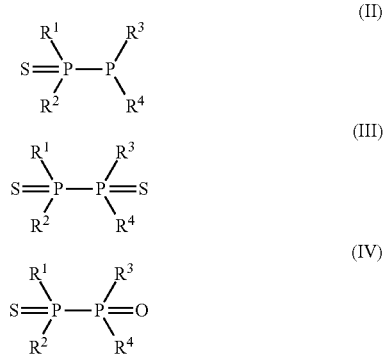

where the symbols have the meanings given above.

In a preferred embodiment the diphosphine is selected from the compounds of groups (III) and (IV), with the compounds of group (IV) being particularly preferred.

Preferably the symbols and indices in formula (I) have the following meanings:

X is preferably S or O.

n is preferably 1.

$R^1$, $R^2$, $R^3$, $R^4$ are preferably independently $C_1$-$C_{10}$-alkyl, $C_1$-$C_{10}$-hydroxyalkyl; $C_1$-$C_{10}$-alkoxy, $C_1$-$C_{10}$-hydroxyalkoxy; $C_3$-$C_{10}$-cycloalkyl, $C_3$-$C_1$-cycloalkoxy, $C_6$-$C_{10}$-aryl, $C_6$-$C_{10}$-aryloxy, $C_6$-$C_{10}$-aryl-$C_1$-$C_4$-alkyl, $C_6$-$C_{10}$-aryl-$C_1$-$C_4$-alkoxy, $C_6$-$C_{10}$-hydroxy-aryl, $C_6$-$C_{10}$-hydroxy-aryloxy, $C_1$-$C_{10}$-thioalkyl, $C_6$-$C_{10}$-thioaryl or $C_1$-$C_4$-thioalkyl-$C_6$-$C_{10}$-aryl.

Preferred are diphosphines of formula (I) where all symbols and indices have the preferred meanings.

More preferred the symbols and indices in formula (I) have the following meanings:

X is more preferred S or O.

n is more preferred 1.

$R^1$, $R^2$ are more preferred identically $C_1$-$C_{10}$-alkyl, $C_6$-$C_{10}$-aryl, $C_1$-$C_{10}$-alkoxy or $C_6$-$C_{10}$-aryloxy.

$R^3$, $R^4$ are more preferred identically $C_1$-$C_{10}$-alkyl, $C_6$-$C_{10}$-aryl, $C_1$-$C_{10}$-alkoxy or $C_6$-$C_{10}$-aryloxy.

More preferred are compounds of formula (I) where all symbols and indices have the more preferred meanings.

Particularly preferred the symbols and indices in formula (I) have the following meanings:

X is particularly preferred S or O.

n is particularly preferred 1.

$R^1$, $R^2$ are particularly preferred identically $C_6$-$C_{10}$-aryl.

$R^3$, $R^4$ are particularly preferred $C_6$-$C_{10}$-aryl or $C_1$-$C_{10}$-alkoxy.

Particularly preferred are compounds of formula (I) where all symbols and indices have the particularly preferred meanings.

Also particularly preferred are the following compounds

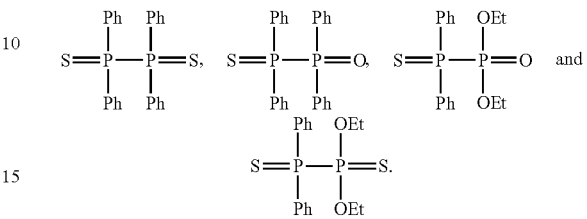

Further preferred compounds of formula (I) are those where $R^1$=$R^2$ and $R^3$=$R^4$.

Further preferred compounds of formula (I) are those where $R^1$=$R^2$=$R^3$=$R^4$.

Further preferred compounds of formula (I) are those where $R^1$, $R^2$, $R^3$, $R^4$ are $C_6$-$C_{10}$-aryl, preferably phenyl and alkyl-substituted phenyl like para-methylphenyl.

Further preferred compounds of formula (I) are liquid at room temperature (20-25° C.).

Further preferred are compounds of formula (I) that are soluble in the polyol or isocyanate component of the polyurethane, more preferred in the polyol component.

Further preferred are compounds of formula (I) where $R^1$ and $R^2$ or $R^3$ and $R^4$ or $R^1$, $R^2$, $R^3$, $R^4$ are $C_1$-$C_{10}$-hydroxyalkyl or $C_1$-$C_{10}$-hydroxyalkoxy, preferably $C_2$-$C_4$-hydroxyalkoxy. Compounds where either $R^1$ and $R^2$ or $R^3$ and $R^4$ are $C_1$-$C_{10}$-hydroxyalkoxy, preferably $C_2$-$C_4$-hydroxyalkoxy, are particularly preferred.

In the terms of the present invention, $C_1$-$C_4$-alkyl refers to a branched or straight-chain saturated hydrocarbon group having 1 to 4 carbon atoms. Examples thereof are methyl, ethyl, propyl, 1-methylethyl (isopropyl), butyl, 1-methylpropyl (sec-butyl), 2-methylpropyl (isobutyl) and 1,1-dimethylethyl (tea-butyl).

$C_1$-$C_6$-alkyl refers to a branched or straight-chain saturated hydrocarbon group having 1 to 6 carbon atoms. Examples thereof are those listed above for $C_1$-$C_4$-alkyl and further pentyl, 1-methylbutyl, 2-methylbutyl, 3-methylbutyl, 2,2-dimethylpropyl, 1-ethylpropyl, hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl and 1-ethyl-2-methylpropyl.

$C_1$-$C_8$-alkyl refers to a branched or straight-chain saturated hydrocarbon group having 1 to 8 carbon atoms. Examples thereof are those listed above for $C_1$-$C_6$-alkyl and further heptyl, octyl, 2-ethylhexyl and their positional isomers.

$C_1$-$C_{10}$-alkyl refers to a branched or straight-chain saturated hydrocarbon group having 1 to 10 carbon atoms. Examples therefore are those listed above for $C_1$-$C_8$-alkyl and further nonyl, decyl and their positional isomers.

Alkoxy refers to straight-chain or branched alkyl groups having n to m carbon atoms, e.g. 1 to 10, in particular 1 to 8 or 1 to 6 or 1 to 4 carbon atoms bonded through oxygen linkages at any C atom in the alkyl group. $C_1$-$C_4$-alkoxy is a linear or branched $C_1$-$C_4$-alkyl group bonded through an oxygen atom such as methoxy, ethoxy, propoxy, isopropoxy, butoxy, secbutoxy, isobutoxy and tert-butoxy. $C_1$-$C_6$-alkoxy is a linear or branched $C_1$-$C_6$-alkyl group bonded through an oxygen atom. Examples are those listed above for $C_1$-$C_4$-alkyl and further pentyloxy, hexyloxy and their positional isomers. $C_1$-$C_8$-alkoxy is a linear or branched $C_1$-$C_8$-alkyl group bonded through an oxygen atom. Examples are those listed above for $C_1$-$C_6$-alkyl and further heptyloxy, octyloxy, 2-ethylhexyloxy and their positional isomers. $C_1$-$C_{10}$-alkoxy is a linear or branched $C_1$-$C_{10}$-alkyl group bonded through an oxygen atom. Examples are those listed above for $C_1$-$C_8$-alkyl and further nonyloxy, decyloxy and their positional isomers.

$C_1$-$C_4$-alkylthio is a linear or branched $C_1$-$C_4$-alkyl group bonded through a sulfur atom such as methylthio, ethylthio, propylthio, 1-methylethylthio (isopropylthio), butylthio, 1-methylpropylthio (sec-butylthio), 2-methylpropylthio (isobutylthio) and 1,1-dimethylethylthio (tert-butylthio).

$C_5$-$C_6$-cycloalkyl refers to a monocyclic 5- or 6-membered saturated cycloaliphatic radical, such as cyclopentyl and cyclohexyl. $C_3$-$C_6$-cycloalkyl refers to a monocyclic 3- to 6-membered saturated cycloaliphatic radical, such as cyclopropyl, cyclobutyl, cyclopentyl and cyclohexyl. $C_3$-$C_8$-cycloalkyl refers to a monocyclic 3- to 8-membered saturated cycloaliphatic radical. Examples are those listed above for $C_3$-$C_6$-cycloalkyl and further cycloheptyl and cyclooctyl. $C_3$-$C_{10}$-cycloalkyl refers to a monocyclic 3- to 10-membered saturated cycloaliphatic radical. Examples are those listed above for $C_3$-$C_8$-cycloalkyl and further cyclononyl and cyclodecyl.

Cycloalkoxy refers to a monocyclic saturated cycloaliphatic radical as defined above which is bonded through an oxygen atom. Examples include cyclopropyloxy, cyclobutyloxy, cyclopentyloxy, cyclohexyloxy, cycloheptyloxy, cyclooctyloxy, cyclononyloxy and cyclodecyloxy.

$C_6$-$C_{10}$-aryl refers to phenyl or naphthyl. The aryl group is either unsubstituted or carries 1 to 3 substituents. Suitable substituents comprise hydroxy, $NO_2$, $C_1$-$C_4$-alkyl, $C_1$-$C_4$-alkoxy, phenyl, naphthyl, $NR^aR^b$, $COR^a$, $COOR^a$ and $CONR^aR^b$, where each $R^a$ and $R^b$ is independently selected from H and $C_1$-$C_4$-alkyl. Preferably, aryl is unsubstituted phenyl or methylphenyl.

$C_6$-$C_{10}$-aryloxy is $C_6$-$C_{10}$-aryl as defined above bonded through an oxygen atom. One example is phenoxy.

$C_6$-$C_{10}$-arylthio is $C_6$-$C_{10}$-aryl as defined above bonded through a sulfur atom. One example is phenylthio.

$C_6$-$C_{10}$-aryl-$C_1$-$C_4$-alkyl is $C_6$-$C_{10}$-aryl as defined above bonded through a $C_1$-$C_4$-alkylene linkage. Examples are benzyl and 2-phenylethyl.

$C_6$-$C_{10}$-aryl-$C_1$-$C_4$-alkoxy is $C_6$-$C_{10}$-aryl as defined above bonded through a $C_1$-$C_4$-alkoxy group. One example is benzyloxy.

$C_1$-$C_{10}$-hydroxyalkyl is $C_1$-$C_{10}$-alkyl as defined above where one hydrogen atom, preferably on the ω-carbon atom is replaced by a hydroxyl group. One example is the hydroxymethyl group.

$C_1$-$C_{10}$-hydroxyalkoxy is $C_1$-$C_{10}$ alkoxy as defined above where one hydrogen atom, preferably on the ω-carbon atom is replaced by a hydroxyl group. One example is the 2-hydroxyethoxy group.

With respect to the use according to the invention of the compounds of formula (I) to (IV), preference is given to the embodiments described above, in each case on their own or in combination with each other.

In preferred embodiments, each R is independently $C_1$-$C_{10}$-alkyl, $C_3$-$C_{10}$-cycloalkyl or $C_6$-$C_{10}$-aryl. More preferably, each R is independently $C_1$-$C_6$-alkyl, $C_5$-$C_6$-cycloalkyl or $C_6$-$C_{10}$-aryl. Even more preferably, each R is independently $C_1$-$C_4$-alkyl or phenyl. Preferably, $C_6$-$C_{10}$-aryl is unsubstituted, i.e. it is unsubstituted phenyl or unsubstituted naphthyl.

Compounds of formula (I) can be produced in accordance with known processes for the preparation of tetraphenyldiphosphine monoxide, e.g. as described in J. Chem. Soc. 1965, 3500; Zh. Obshch. Khim. 1979, 49, 2418; the contents of which are hereby incorporated by reference. Suitable methods are for example reacting a diaryl halogenophosphine with diaryl alkoxyphosphine of the formula

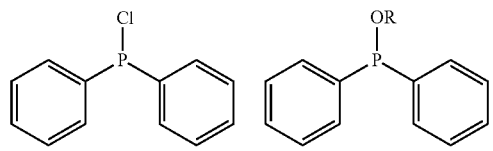

where R is a an alkyl group. The reaction is generally carried out in a suitable solvent or without a solvent. Suitable solvents are acyclic ethers, such as diethyl ether, dipropyl ether, diisopropyl ether, dibutyl ether, diisobutyl ether, methyl-tert-butyl ether, ethyl-tert-butyl ether and the like, cyclic ethers, such as tetrahydrofuran and 1,4-dioxane, and aprotic aromatic solvents, such as benzene, toluene, or the xylenes. Preferred is the production of the product in the presence of excess of liquid diaryl alkoxyphosphine. The diaryl halogenophosphine and the diaryl alkoxyphosphine are preferably used in a molar ratio of from 0.5:1 to 1:5, more preferably from 0.8:1 to 1:3, even more preferably from 0.9:1 to 1:2.6. The reaction temperature is preferably 0 to 150° C. or 20 to 130° C. After completion of the reaction, the reaction mixture is in general freed from the solvent used and from unreacted starting material, e.g. by filtration and evaporation of the solvent. The obtained product can be used as such or be further purified. Purification can be carried out by known methods, e.g. by washing or digesting the residue with non-solvents or by recrystallization, the latter being preferred. Recrystallization is carried out in a suitable solvent, generally at elevated temperature, e.g. at the boiling point of the mixture. Suitable solvents are aprotic or protic in the absence of air. Examples are aromatic solvents, such as benzene, toluene or the xylenes, cycloaliphatic solvents, such as cyclopentane, cyclohexane or methylcyclohexane, and carbonic acid derivatives, such as ethyl acetate, ethyl propionate or propyl acetate; methanol, ethanol, isopropanol, water or mixtures thereof. Preferably, aromatic solvents are used, specifically toluene.

In a preferred embodiment of the invention one compound of formula (I) is used as a flame retardant.

In a further preferred embodiment two or more, preferably two compounds of formula (I) are used as a flame retardant.

The disphosphine compounds of formula (I) may be further used in combination with one or more further conventional flame retardant(s).

In a further preferred embodiment a mixture of at least one diphosphine (I) and one or more, preferably one or two structurally different flame retardant(s), like organic phosphate(s), are used as flame retardant.

Generally, 1 to 35, preferably 1 to 25, more preferred 2 to 15, in particular 5 to 15 parts by weight (per 100 parts by weight of the polyurethane component) are employed.

In a preferred mixture the weight ratio of diphosphines to structurally different flame retardants is preferably from 10:1 to 1:10, more preferred from 5:1 to 1:5.

Preferred conventional flame retardants are the hydroxides, oxides and oxide hydrates of group 2, 4, 12, 13, 14 and 15 (semi)metals, nitrogen-based flame retardants and phosphorous-based flame retardants.

Examples for hydroxides, oxides and oxide hydrates of group 2, 4, 12, 13, 14 and 15 (semi)metals are magnesium oxide or hydroxide, aluminium oxide, aluminum trihydrate, silica, tin oxide, antimony oxide (III and V) and oxide hydrate, titanium oxide and zinc oxide or oxide hydrate.

Examples for nitrogen-based flame retardants are melamine and urea, melamine and urea based resins and melamine cyanurate and melamine borate.

Examples for phosphorous-based flame retardants are red phosphorous, ammonium polyphosphates, phosphoric esters, in particular triarylphosphates, such as triphenyl phosphate, tribenzyl phosphate, tricresyl phosphate, tri-(dimethylphenyl) phosphate, benzyl dimethylphosphate, di-(dimethylphenyl)phenyl phosphate, diphenylcresylphosphate (DPK), resorcinol-bis(diphenyl phosphate) (RDP), recorcinol-bis-[di-(2,6-dimethylphenyl)-phosphate] (PX-200), aluminum diethylphosphinate (Exolit® OP 1230), but also aliphatic phosphates, such as tris(2-chloroisopropyl)phosphate (Lupragen® TCPP), triethylphosphate (TEP), aromatic polyphosphates, e.g. polyphosphates derived from bisphenols, such as the compounds described in US 2004/0249022), and phosphonic esters, such as dimethyl-methyl phosphonate diethyl-ethyl phosphonate (DEEP) and phosphonic acid (2-((hydroxymethyl)carbamyl)ethyl) dimethylester, polycyclic phosphorous-containing compounds, such as 9,10-dihydro-9-oxa-10-phosphaphenanthrene-10-oxide (DOPO) and phosphites and phosphinites.

In one preferred embodiment, the diphosphine compounds of formula (I) are not used together with a further flame retardant selected from halogen-based flame retardants. In one embodiment, the diphosphine compounds of formula (I) are not used together with a further flame retardant.

In yet another preferred embodiment, the diphosphines of the invention are used together with one or more further flame retardant(s) and/or one or more synergist(s). Synergists are compounds which improve the effect of the proper flame retardant, often in an overadditive (synergistic) manner. Synergists which advantageously can be combined with the diphosphines of the invention are selected from hydroxides, oxides and oxide hydrates of group 2, 4, 12, 13, 14 and 15 (semi)metals, such as magnesium oxide or hydroxide, aluminium oxide, aluminum trihydrate, silica, tin oxide, antimony oxide (III and V) and oxide hydrate, titanium oxide and zinc oxide or oxide hydrate, from further zinc compounds, such as zinc borate, zinc stannate or zinc sulfide, from nitrogen-based flame retardants, such as melamine and urea, melamine and urea based resins, melamine cyanurate, melamine borate, melamine phosphate, melamine polyphosphate or melamine pyrophosphate, and from phosphorous-based flame retardants, such as phosphinate metal salts, such as aluminum diethylphosphinate (Exolit®OP 1230), phosphates, such as resorcinol-bis[diphenyl phosphate], resorcinol-bis[di-(2,6-dimethylphenyl)-phosphate] (PX-200), or tris(2-chloroisopropyl)phosphate (Lupragen® TCPP), phosphonic esters, such as dimethyl-methyl phosphonate, polycyclic phosphorus-containing compounds, such as 9,10-dihydro-9-oxa-10-phosphaphenanthrene-10-oxide (DOPO) or derivatives thereof. Other synergists can be materials based on the phenolic novolac family, such as those obtained from phenol-formaldehyde condensation reactions. Also sulfur-containing substances can be used as further flame retardants and/or synergists, like elemental sulfur, thioethers, thiophosphates, organic disulfides, like diphenyl disulfide, and the like. Preferred synergists are inorganic or organic phosphates.

The above-mentioned hydroxides, oxides and oxide hydrates in general also possess antidripping properties, which is relevant for thermoplastic PU. Further examples for antidripping agents are polytetrafluoroethylenes.

The term polyurethane material as used herein denotes a material comprising a polyurethane component (a), a flame retardant (b), comprising one or more diphosphine compounds of formula (I) and optionally one or more further flame retarding compounds and/or one or more synergists; optionally further one or more non-polyurethane polymers (c), and further one or more additives (d) which are not flame retardants.

The term "polyurethane component" as used herein denotes one or more polyurethanes. The term "polyurethane" as used herein comprises polyurethanes as well as polyisocyanurates.

Suitable polyisocyanate polyaddition products (polyurethanes) are, for example, cellular polyurethanes. These polymers are common knowledge and their preparation has been widely described. They are typically prepared by reacting difunctional and higher polyfunctional isocyanates or corresponding isocyanate analogs with isocyanate-reactive compounds. The preparation takes place by typical methods, such as by the one-shot method or by the prepolymer method, in open or closed molds, in a reaction extruder or else on a belt unit, for example. One specific preparation process is the reaction injection molding (RIM) process, which is used preferably for preparing polyurethanes having a foamed or compact core and a predominantly compact, nonporous surface. Diphosphine compounds (I) are suitable for all these processes.

Polyurethanes are generally synthesized from at least one polyisocyanate and at least one compound having at least two groups per molecule that are reactive toward isocyanate groups. Suitable polyisocyanates possess preferably 2 to 5 NCO groups. The groups that are reactive toward isocyanate groups are preferably selected from hydroxyl, mercapto, primary and secondary amino groups. Included here are preferably dihydric or higher polyhydric polyols.

Suitable polyisocyanates are aliphatic, cycloaliphatic, araliphatic and aromatic isocyanates. Suitable aromatic diisocyanates are, for example, diphenylmethane 2,2'-, 2,4'- and/or 4,4'-diisocyanate (MDI), naphthylene 1,5-diisocyanate (NDI), tolylene 2,4- and/or 2,6-diisocyanate (TDI), 3,3'-dimethyldiphenyl diisocyanate, 1,2-diphenylethane diisocyanate and/or phenylene diisocyanate. Aliphatic and cycloaliphatic diisocyanates comprise, for example, tri-, tetra-, penta-, hexa-, hepta- and/or octamethylene diisocyanate, 2-methylpentamethylene 1,5-diisocyanate, 2-ethylbutylene 1,4-diisocyanate, 1-isocyanato-3,3,5-trimethyl-5-isocyanatomethyl-cyclohexane (isophorone diisocyanate, IPDI), 1,4- and/or 1,3-bis(isocyanatomethyl)cyclohexane (HXDI), cyclohexane 1,4-diisocyanate, 1-methyl-2,4- and/or 2,6-cyclohexane-diisocyanato and/or dicyclohexylmethane 4,4'-, 2,4'- and/or 2,2'-diisocyanate. Examples of higher polyfunctional isocyanates are polymeric MDIs and mixtures of monomeric MDI and polymeric MDI (known as crude MDI or commercially available mixtures like Lupranat M50), triisocyanates, such as triphenylmethane 4,4',4"-triisocyanate, and also the isocyanurates, carbodiimides, allophanates, and/or uretdions of the aforementioned diisocyanates, and also the oligomers obtainable by partial reaction of diisocyanates with water, such as the biurets of the aforementioned diisocyanates, and, furthermore, oligomers obtainable by targeted reaction of semiblocked diisocyanates with polyols having on average more than 2 and preferably 3 or more hydroxyl groups. Suitable polyisocyanates also include so-called prepolymers, which are obtained by the reaction of di- and/or polyisocyanates with di- and/or polyfunctional NCO-reactive compounds, eg. polyols, in a way that an excess of NCO groups is present and a product is obtained that contains oligomers, that contain, eg., urethane moieties within the oligomer backbone, and NCO groups at the oligomer backbone termini.

Polyol components used in this context, for rigid polyurethane foams, which if appropriate may have isocyanurate structures, are high-functionality polyols, especially polyether polyols based on high-functionality alcohols, glycerine and trimethylolpropane alcohols, pentaerythritol alcohols, sugar alcohols and/or saccharides as starter molecules. Also low functional polyols may be used as additional polyols. In many cases also polyesterols are used. For flexible polyisocyanate polyaddition products, such as flexible polyurethane foams or RIM materials, preferred polyols are 2- to 3-functional polyether polyols based on glycerol and/or trimethylolpropane and/or glycols as starter molecules, and 2- to 3-functional polyether polyols based on glycerol and/or trimethyllolpropane and/or glycols as alcohols for esterification. Also higher functional polyols and polyols with functionalities between 1.5 and 2 may be used as additional polyols. Thermoplastic polyurethanes are based typically on predominantly difunctional polyester polyalcohols and/or polyether polyalcohols which preferably have an average functionality of 1.8 to 2.5, more preferably 1.9 to 2.1.

The preparation of the polyether polyols in this context takes place in accordance with known technologies. Examples of suitable alkylene oxides for preparing the polyols include propylene 1,3-oxide, butylene 1,2- and/or 2,3-oxide, styrene oxide, and, preferably, ethylene oxide and propylene 1,2-oxide. The alkylene oxides can be used individually, alternately in succession, or as mixtures. Certain polyols may be alkoxylated with ethylene oxide at the end of the alkoxylation process and so have primary hydroxyl groups. Polyols can also be obtained from the alkoxylation of amines or aminoalcohols, especially polyols from the alkoxylation of aminoalcohols like ethanolamine or triethanolamine, aromatic amines like toluol diamines or aliphatic amines like ethylene diamine and the like. Further suitable polyetherols are polytetrahydrofurans and polyoxymethylenes. The polyether polyols possess a functionality of preferably 2 to 8 and in particular 2 to 5 and molecular weights of 100 to 15 000, preferably 200 to 8000.

Suitable polyester polyols can be prepared for example from organic dicarboxylic acids having 2 to 12 carbon atoms, preferably dicarboxylic acids having 4 to 8 carbon atoms, like aromatic diacids like phthalic acid or terephthalic acid or aliphatic diacids like adipic acid, succinic acid or sebacinic acid, and from polyhydric alcohols, preferably diols, having 2 to 12 carbon atoms, preferably 2 to 6 carbon atoms. The polyester polyols preferably possess a functionality of 2 to 5, in particular 1.8 to 3, and a molecular weight of 250 to 8000, preferably 300 to 4000, and in particular 300 to 3000.

The polyol component may further comprise diols or higher polyhydric alcohols. Suitable diols are glycols having preferably 2 to 25 carbon atoms. These include 1,2-ethanediol, 1,2-propanediol, 1,3-propanediol, 1,4-butanediol, 1,5-pentanediol, 1,6-hexanediol, 1,10-decanediol, diethylene glycol, 2,2,4-trimethylpentane-1,5-diol, 2,2-dimethylpropane-1,3-diol, 1,4-dimethylolcyclohexane, 1,6-dimethylolcyclohexane, 2,2-bis(4-hydroxyphenyl)propane (bisphenol A), 2,2-bis(4-hydroxyphenyl)butane (bisphenol B) or 1,1-bis(4-hydroxyphenyl)-3,3,5-trimethylcyclohexane (bisphenol C). Suitable higher polyhydric alcohols are, for example, trihydric (triols), tetrahydric (tetrols) and/or pentahydric alcohols (pentols). They generally have 3 to 25, preferably 3 to 18 carbon atoms. They include glycerol, trimethylolethane, trimethylolpropane, erythritol, pentaerythritol, sorbitol, and the alkoxylates thereof.

As polyols can also be used polymer-modified polyols, preferably graft polyols, for example such based on styrene and/or acrylonitrile. Such graft polyols are made by in-situ polymerization of styrene, acrylonitrile or preferably mixtures of both in any carrier polyol, as described in German patents DE 1111394, 1222669, 1152536 and 1152537.

To modify the mechanical properties, e.g. hardness, it may be advantageous to add chain extenders, crosslinking agents, stoppers or, if appropriate, mixtures of these. Chain extenders and/or crosslinking agents generally have a molecular weight of 40 to 300. Suitable examples include aliphatic, cycloaliphatic and/or araliphatic diols having 2 to 14, preferably 2 to 10 carbon atoms, such as ethylene glycol, 1,3-propanediol, 1,2-propanediol, 1,10-decanediol-, 1,2-, 1,3-, 1,4-dihydroxycyclohexane, diethylene glycol, dipropylene glycol, and, preferably, ethylene glycol, 1,4-butanediol, 1,6-hexanediol, and bis(2-hydroxyethyl)hydroquinone, triols, such as 1,2,4-, 1,3,5-trihydroxycyclohexane, glycerol, trimethylolpropane, triethanolamine, and low molecular mass, hydroxyl-containing polyalkylene oxides based on ethylene oxide and/or propylene 1,2-oxide and the aforementioned diols and/or triols as starter molecules. Suitable stoppers comprise, for example, monofunctional alcohols or secondary amines.

For fast reactivities also amine-terminated structures may be used alone or in combination with polyols, this includes aromatic polyamines like methylene diphenyldiamine (MDA) and tetraethyl-toluoldiamine (TETDA) as well as aliphatic polyamines like polymethylene diamines and polyetherpolyamines.

In one preferred embodiment the polyurethane component is a rigid foam, specifically a PU rigid foam or a PIR (polyisocyanurate) rigid foam. A PIR rigid foam is a material that in general also contains a certain amount of urethane groups. This also includes materials with a higher amount of urethane groups than isocyanurate groups.

Flame retarded rigid foams are preferably used in sandwich panels with a rigid (eg. metal sheet) or flexible (eg. aluminium foil) facings, in insulation boards and as in-situ spray foams.

In another preferred embodiment the polyurethane component is a flexible foam. The flexible foam can be a molded or preferably a slabstock foam. The slabstock foams can be conventional or high-resilience slabstock foams. Flame retarded flexible foams are preferably used in furniture, bedding (eg. mattresses, pillows) and seating applications (eg. car seatings).

In a further preferred embodiment the polyurethane component is a thermoplastic elastomer (TPU). The TPU can be an extrusion or injection moulded product. Flame retarded TPU is preferably used in cable jacketing and sheathing materials, hoses, foils, shoe soles, coatings, adhesives and sealants.

The polyurethane component may optionally contain various conventional additives.

Suitable conventional additives comprise e.g. catalysts, antioxidants, antiscorch agents, UV absorbers/light stabilizers, metal deactivators, antistatic agents, reinforcing agents, fillers, antifogging agents, biocides, lubricants, emulsifiers, surfactants, foam stabilizers, cell opening agents, antifoaming agents, colorants, pigments, rheology additives, mold release agents, tackifiers, flow-control agents, optical brighteners, blowing agents, smoke suppressants, nucleating agents and plasticisers.

If a foamed polyurethane material is desired, blowing agents are present during the polyurethane reaction of thermoset polyurethanes. The blowing agents can be chemical or physical blowing agents. They are mixed in advance to the polyurethane raw materials or added as a separate feed to the polyol+isocyanate mixing area. For foamed thermoplastic polyurethanes, the blowing agents may be introduced before, during or after the polyurethane reaction.

Suitable blowing agents are chemical blowing agents like water or organic carboxylic acids, especially formic acid. Any low boiling chemical compound can be used as physical blowing agent. Typical physical blowing agents are carbon dioxide, low-boiling hydrocarbons, low molecular weight monofunctional alcohols like tertiary butanol, acetales like dimethylacetal, esters like methyl formate and fully or partly halogenated hydrocarbons. Preferred hydrocarbons are low-boiling cyclic or acyclic saturated hydrocarbons with up to 12 carbons, especially pentanes like cyclopentane or n-pentane. Preferred halogenated hydrocarbons are partly chlorinated and fluorinated hydrocarbons like dichlorofluoroethane (141b), partly fluorinated hydrocarbons like Tetrafluoroethane (134a), pentafluoropropane (245fa), pentafluorobutane (365mfc) and hexafluorobutane (356 mmf), heptafluoropropane (227ea) and the like. Also unsaturated halogenated hydrocarbons are possible blowing agents like tetrafluoropropene.

Another class of blowing agents are substances that release gaseous products upon (thermal) decomposition like azo-bis-(isobutyronitrile) (AIBN).

From the blowing agents can be used single ones or any combination of at least two and as many as desired.

As catalyst can be used any chemical compound that accelerates the reaction of isocyanates with isocyanate-reactive compounds as well as the reaction of isocyanates with themselves. Preferred as catalysts are such compounds that accelerate the urethane, urea and isocyanurate reaction.

Preferred are amines, especially tertiary amines, tin and bismuth compounds, metal carboxylates, quaternary ammonium salts, s-hexahydrotriazines and tris-(dialkylaminomethyl)-phenols.

Typical catalysts are organometal compounds, preferably tin compounds like tin(II)salts of organic carboxylic acids, for example tin(II)acetate, and dialkyl tin(IV)salts of organic carboxylic acids, for example dibutyl-tin(IV)dilaurate. Organic amines used as catalysts are amidines like 2,3-dimethyl-3,4,5,6-tetrahydropyrimidin or 1,8-Diazabicyclo[5.4.0]undec-7-en, tertiary amines like trialkylamines, N-alkylmorpholines, N,N,N',N'-tetramethyl polymethylene diamines, pentamethyl-di(polymethylene)triamines, tetramethyl-diaminoalkylethers, N,N'-dialkylpiperazines, N-alkylimidazoles, bicyclic amines and diamines like 1,4-diaza-bicyclo(2,2,2)octane (DABCO or triethylenediamine), alcanolamines like N,N-dimethylethanolamine.

As further catalysts may be used tris(dialkylaminoalky)s-hexahydrotriazines, tetralkylammonium or alkali hydroxides, alcoholates, carboxylates like alkali salts of fatty acids.

The polyurethane material can be equipped with compounds of formula (I) (and with the optional further flame retardants, synergists and/or additives) before, during or after the preparation of the polyurethane.

The thermoset polyurethane is made by reacting the polyol component with the isocyanate component. In general, the compound(s) of formula (I) and the optional further components may be added in advance to the polyol component or the isocyanate component, preferably to the polyol component.

In another embodiment, the compound(s) of formula (I) may be dosed as a separate feed directly to the polyol+isocyanate mixing area.

In case of a thermoplastic polyurethane, the compound(s) of formula (I) may be added before the polyurethane reaction into the polyol component or isocyanate component, during the polyurethane reaction into the extruder or after the polyurethane reaction to the mixing apparatus used in accordance with the invention. The polyurethane component in form of granules, powder, pellets or grindstock is then melted at temperatures of 150 to 260° C., for example. The polyurethane component, the compound(s) of formula (I) and any further optional additives can also be mixed cold and the mixture thereafter is melted and homogenized. Suitable temperatures are typically in the range from 150 to 260° C.

The compounds of formula (I) can also be sprayed onto the polyurethane material. For spray applications the compounds themselves or solutions of the compounds in suitable solvents might be used.

The compounds of formula (I) and optionally further additives can also be added to the thermoplastic polyurethane in the form of a masterbatch (concentrate) which contains the components in a concentration of, for example, about 1% to about 40%, for example about 2% to about 20% by weight, based on the total weight of the concentrate, incorporated in a polyurethane. The masterbatch need not necessarily be of the same structure as the polyurethane to which the additives are added. In such operations, the masterbatch can be used in the form of powder, granules, solutions, suspensions or in the form of latices.

The compounds of formula (I) can be added to the polymer component in the form of coated capsules, the compound of formula (I) forming the capsule core which is surrounded by a suitable coating material. Suitable coating materials are those which protect the diphosphine of the invention from the detrimental effect which may be caused by oxygen and moisture and which form a suitable coating. Suitable coating materials are the fillers listed in the introductory part as anti-dripping agents, the materials listed as suitable synergists for the diphosphines of the invention and also resins such as melamine resins, urea resins, acrylate resins and/or PU resins. Preferably, the coating material is chosen as to provide a flame retardant effect too, and in particular as to act as a synergist for the diphosphines of the invention, i.e. to improve their effectiveness as flame retardants. Preferred coating materials are (semi)metal hydroxides, (semi)metal oxides and (semi)metal oxide hydrates, such as aluminum trihydrate ($Al(OH)_3$), magnesium oxide, magnesium hydroxide, zinc hydroxide, zinc oxide, silica, tin oxide, tin oxide hydrate, antimony oxide (III and V) and titanium dioxide, and in particular aluminum trihydrate, optionally in combination with a further hydroxide or oxide, such as magnesium hydroxide, zinc hydroxide, zinc oxide or lead hydroxide. The coating can be carried out in analogy to the coating process described in U.S. Pat. No. 4,210,630, e.g. by treating an aqueous suspension of a compound of formula (I) with a water soluble salt of one or more of the above-mentioned (semi)metals in the presence of a base, such as an alkali hydroxide or an alkali or earth alkaline carbonate. The resulting (semi)metal hydroxide precipitates on the dispersed particles of the compound of formula (I). Preferably, the coated capsules have a mean (median) diameter of 1 µm to about 100 µm.

Diphosphine compounds (I) which are liquid at room temperature and/or are soluble in the polyol component or the isocyanate component, preferably the polyol component, are especially suitable for this embodiment.

In addition, compounds (I) with hydroxy functions, preferably 2 or 4, especially 2 hydroxy functions that are incorporated into the polymer are preferred.

Preferably, the compounds of formula (I) are incorporated into the polyurethane component in an amount of from 1 to 35 parts by weight, more preferably from 1 to 25 parts by weight, even more preferably from 2 to 15 parts by weight, e.g. from 3 to 13 parts by weight or from 3 to 12 parts by weight, and in particular from 5 to 15 parts by weight, e.g. from 6 to 13 parts by weight or from 7 to 12 parts by weight, based on 100 parts by weight of the polyurethane component.

In a further aspect, the invention provides a method for flame retarding or reducing the flammability of a polyurethane material which comprises the steps of incorporating into the material at least one compound of formula (I) as defined above. The preferred embodiments of compounds of formula (I), suitable and preferred polyurethane components and optional additives and to methods for incorporating the compound of formula (I) to (V) and further optional additives into the polyurethane component foam also apply.

In a further aspect, the invention provides a polyurethane material, comprising
(a) a polyurethane component;
(b) at least one compound of formula (I) as defined above and optionally further flame retarding compounds and/or synergists;
(c) optionally one or more further polymers different from polyurethane;
(d) optionally further additives,
where the component (b) is preferably comprised in an amount of from 1 to 15 parts by weight, based on 100 parts by weight of the polyurethane component (a).

The preferred embodiments of the compounds of formula (I), suitable and preferred polyurethane components and optional additives and methods for incorporating derivatives of diphosphines of the invention and further optional additives into the polyurethane materials apply likewise.

Preferably, if the polyurethane material is a foam, it comprises the compound of formula (I) to (IV) in an amount of from 3 to 15% by weight, more preferably from 6 to 15% by weight, e.g. from 6 to 13% by weight or from 6 to 12% by weight, and in particular from 8 to 15% by weight, e.g. from 8 to 13% by weight or from 8 to 12% by weight, based on the weight of the polyurethane component.

If the PU foam comprises more than one compound of formula (I), the two or more components are preferably comprised in an amount of from 2 to 15% by weight, more preferably from 3 to 15% by weight, even more preferably from 6 to 15% by weight, e.g. from 6 to 13% by weight or from 6 to 12% by weight, and in particular from 8 to 15% by weight, e.g. from 8 to 13% by weight or from 8 to 12% by weight, based on the weight of the PU-material.

In a yet further aspect, the invention provides a composition comprising
(a) polyurethane monomer components and
(b) at least one compound of formula (I) as defined above.

The remarks made above as to preferred embodiments of compounds of formula (I) and to optional additives apply here, too.

The polymerizable monomer may be any of the monomers mentioned above in context with the polyurethane component, provided it is compatible with at least one of the diphosphines of the invention. Compatible means that there are no adverse interactions between the diphosphine and the monomer which negatively influence the flame retardant properties of the polymeric material produced from the monomer of the composition.

Preferably, the composition of the invention is in the liquid or solid state at ambient temperature (25° C.). Thus, preferably, the monomers are either selected so as to be in the liquid or solid state at ambient temperature depending on polyurethane material class or targeted application.

Suitable polyols and polyfunctional isocyanates are those listed above.

The composition of the invention is generally prepared by mixing the at least one diphosphine of the formula (I) with the monomers or monomer mixture.

The composition may further contain at least one of the additives mentioned above for the polyurethane material. The composition may also contain a polymerization inhibitor for stabilizing monomers susceptible to premature/undesired polymerization.

The flame retarding properties of the components of formula (I) to (IV) are determined in accordance with standard methods used to assess flame retardancy. These include the UL 94 Test for Flammability of Plastic Materials for Parts in Devices and Appliances, 5th Edition, Oct. 29, 1996; Limiting Oxygen Index (LOI), (ASTM D-2863); and Cone Calorimetry, (ASTM E-1354), BKZ V, B2, crib 5, California TB 117 A.

The invention is further illustrated by the following examples without limiting it thereby.

EXAMPLES

Functionality of polyols is defined as the average number of OH-groups per averaged polyol structure. OH-number is the average mass concentration of OH-groups per polyol defined as OH-number=56100*functionality of polyol/molecular weight of polyol.

The index is defined as moles NCO-groups per moles NCO-reactive groups*100.

A) Low Density High Resilience (HR) Polyurethane Foams
General Procedure

All components except isocyanate and metal catalyst are put together and stirred, and the metal catalyst is subsequently added under stirring. Afterwards, the measured amount of isocyanate component is added under stirring. The mixture is stirred until the reaction starts and then poured into a metal box coated with plastic foil. The batch size is 1800 g in each case. The foam forming reaction was completed over night and the foam then obtained was sawed into desired pieces. Reference examples 1, 2 and examples 1-4 were obtained by this procedure.

Starting Materials

Polyol 1: Polyoxypropylene-polyoxyethylene-polyol; OH-number: 35 mg KOH/g; functionality: 2.7

Polyol 2: Graft polyol based on styrene-acrylonitrile; solids content 45% by weight; polyoxypropylene-polyoxyethylene-polyol; OH-number: 20 mg KOH/g; functionality 2.7

Catalyst system 1: Standard catalytic system comprising a metal catalyst and amine catalysis Catalyst system 2: combination of amine catalysts partially blocked by an organic acid Properties and flame retardancy characteristics of HR foam materials according to the invention are shown in Table 1.

TABLE 1

HR flexible foams (index = 107) (all quantities are parts by weight)

| component/property | Ref. 1 | Ref. 2 | Ref. 3 | Ex. 1 | Ex. 2 | Ex. 3 |
|---|---|---|---|---|---|---|
| Polyol 1 | 66.70 | 66.70 | 66.70 | 66.70 | 66.70 | 66.70 |
| Polyol 2 | 33.30 | 33.30 | 33.30 | 33.30 | 33.30 | 33.30 |
| Tegostab B8681 [4] | 0.50 | 0.50 | 0.50 | 0.50 | 0.50 | 0.50 |
| Catalyst system 1 | 0.42 | 0.45 | 0.45 | 0.40 | | |
| Diethanolamine (80%) | 1.49 | 1.49 | 1.49 | 1.49 | 1.49 | 1.49 |
| Ortegol 204 [5] | 1.50 | 1.50 | 0.75 | 0.75 | 1.50 | 1.50 |
| Catalyst system 2 | | | | | 0.65 | 0.65 |
| Glycerol | | | | | 1.00 | 1.00 |
| Water | 1.65 | 2.45 | 2.50 | 2.30 | 2.50 | 2.57 |
| Tris (2-chloroisopropyl)phosphate | | 8.00 | | | | |
| Tetraphenyldiphosphinmonoxide | | | 8.00 | | | |
| Tetraphenyldiphosphinoxidsulfide | | | | 8.00 | | |
| Tetraphenyldiphosphindisulfide | | | | | 8.00 | |
| 1,1-Diethoxy-2,2-diphenyl-diphosphine-1-oxide-2-sulfide | | | | | | 8.00 |
| Isocyanat 1 | 100 | 100 | 100 | 100 | 100 | 100 |
| Density [1] [kg/m$^3$] | 37.2 | 31.4 | 31.4 | 31.8 | 30.7 | 32.5 |
| CLD 40% [2] [kPa] | 3.5 | 3.8 | 3.3 | 2.8 | 3.6 | 3.9 |
| California TB 117 A [3] | | | | | | |
| Average char length [mm] | 262 | 139 | 124 | 110 | 128 | 134 |
| Maximum char length [mm] | 306 | 150 | 146 | 125 | 140 | 147 |
| Average afterburn time [s] | 29 | 0 | 0 | 0 | 0 | 0 |
| Maximum afterburn time [s] | 42 | 0 | 0 | 0 | 0 | 2 |
| Average afterglow time [s] | 0 | 0 | 0 | 0 | 0 | 0 |
| Result | failed | passed | passed | passed | passed | passed |

[1] determined according to DIN EN ISO 845
[2] compression load deflection determined according to DIN EN ISO 3386
[3] California TB 117 A test (Vertical burning test. A detailed description of the test can be found in the Technical Bulletin 117 of the State Of California - Department of Consumer Affairs Bureau of Home Furnishing and Thermal Insulation.)
[4] Tegostab B8681 is a silicon-based foam stabilizer from Evonik Goldschmidt GmbH
[5] Ortegol 204 is a crosslinking/curing agent from Evonik Goldschmidt GmbH.

The results show that the halogen-free polyurethane flexible foams according to the invention containing diphosphine compounds possess an excellent flame protection similar or better compared to halogen-containing comparative foams.

B Polyurethane Hard Foam
General Procedure

Polyols, stabilizers, flame retardants, catalysts and blow agents are mixed and stirred. The isocyanate is added subsequently with stirring, and the whole mixture is foamed to a polyurethane hard foam. By adjusting the amount of catalyst the curing time is 45 seconds in each case. The density is adjusted to a constant 45 g/l through the quantity of blowing agent.

Starting Materials
Polyol 1: esterification product of dimethylterephthalate and diethylene glycol, OH number=240 g KOH/g
Polyol 2: esterification product of phthalic anhydride and diethylene glycol, OH number=220 mg KOH/g
Polyol 3: polyethylene glycol, OH number=200 mg KOH/g
Polyol 4: propoxylated sorbitol, OH number=490 mg KOH/g
Stabilizer 1: Tegostab B 8462 (Evonik Goldschmidt GmbH)
Stabilizer 2: Tegostab B 8467 (Evonik Goldschmidt GmbH)
Stabilizer 3: Niax Silicone L 6635 (GE Silicones)
Flame retardant 1: tetraphenyldiphosphinmonoxide
Flame retardant 2: tris (2-chloroisopropyl)phosphate (TCPP)
Flame retardant 3: tetraphenyldiphosphindisulfide
Flame retardant 4: 1,1-diethoxy-2,2-diphenyl-diphosphin-1-oxide-2-sulfide
Blowing agent 1: n-pentane
Blowing agent 2: formic acid (85% by weight)
Blowing agent 3: water:dipropylene glycol=3:2
Catalyst 1: potassium formiate (36% by weight in ethylene glycol)
Catalyst 2: bis(2-dimethylaminoethyl)ether (70% by weight in dipropylene glycol)
Isocyanate 1: Lupranat M50 (BASF SE)

Properties and flame retardant characteristics of polyurethane hard foam according to the invention are shown in Table 2.

TABLE 2

Polyurethane rigid foams (all quantities are in parts by weight)

| | Ref. 4 | Ref. 5 | Ex. 4 | Ex. 5 | Ref. 6 |
|---|---|---|---|---|---|
| Polyol 1 | 45 | 45 | | | |
| Polyol 2 | 13 | 13 | 58 | 58 | 58 |
| Polyol 3 | 10 | 10 | 10 | 10 | 10 |
| Polyol 4 | | | | | |
| Stabilizer 1 | 2 | 2 | | | |
| Stabilizer 2 | | | 2 | 2 | 2 |
| Stabilizer 3 | | | | | |
| Flame retardant 1 | 30 | | | | |
| Flame retardant 2 | | 30 | | | 30 |
| Flame retardant 3 | | | 30 | | |
| Flame retardant 4 | | | | 30 | |
| Blowing agent 1 | 7 | 7 | 10 | 10 | 10 |
| Blowing agent 2 | 2.1 | 2.3 | 1.5 | 1.8 | 1.5 |
| Blowing agent 3 | | | | | |
| Catalyst 1 | 1.5 | 1.5 | 1.8 | 1.8 | 1.8 |
| Catalyst 2 | 1.5 | 1.5 | 1.5 | 1.4 | 1.5 |
| Isocyanate 1 | 190 | 190 | 190 | 190 | 190 |
| Density (g/L) | 45 | 45 | 45 | 45 | 45 |
| Tack free time (s) | 64 | 77 | 71 | 77 | 77 |
| Bolt: hardness after 6 min (N) | 93 | 103 | 110 | 112 | 118 |
| Bolt: breaking time (min) | | | 5 | 6 | 5 |
| B2-test (cm) | 7 | 7 | | | 8 |
| BKZ5-test (cm) | | | 6 | 7 | 6 |
| TGA 90% (° C.) | | | 309 | 298 | 250 |
| TGA 75% (° C.) | | | 379 | 383 | 330 |
| TGA 50% (° C.) | | | 510 | 505 | 485 |

Measurement Methods

Density: The bulk density of the foam is calculated as the quotient of the mass of the foam and its volume according to DIN 53420.

Tack free time: is defined as the period of time between the start of stirring and the time when hardly any tacking effect can be determined when the foam is touched with a rod. Tack free time is an indicator for the effectiveness of the polymerisation.

Bolt: 6 min after mixing of the components a steel bolt with a spherical cap of 10 mm radius is pressed 10 mm into the formed foam by a tension compression fatigue testing apparatus. The maximum force necessary to achieve this (in N) is an indicator for the degree of curing of the foam. As a measure for the brittleness of the foam the time is determined, when the surface of the foam shows visible fracture zones in the bolt test. The earlier fracture zones appear the higher is the brittleness of the foam.

B2-Test: In the flaming test according to DIN 4102 the height of the flame is measured in mm. The height of the flame must not exceed 15 cm.

BKZ5-Test: In the flaming test according to Swiss norm BKZ/V, the flame height is measured in cm.

TGA: Thermogravimetric analysis is carried out in an air atmosphere (60 ml air as flushing gas) and a heating rate of 5 K/min up to 650° C. At 90%, 75% and 50% remaining mass of foam the temperature is recorded. A loss of mass of the foam at higher temperatures means a higher thermal and oxidative stability of the flame protected foam.

The examples in Table 2 demonstrate that halogen-free polyurethane rigid foams according to the invention show an excellent flame protection similar or equal to halogen-containing comparative foams. In addition, surprisingly the thermal and oxidative stability in the TGA measurements is markedly higher over the complete measured temperature range than in the comparative foams. Further, advantageously the tack-free state is generally reached earlier, curing remains very good and brittleness is equal to or even lower than in the comparative foams.

C Thermoplastic Polyurethane (TPU)

General Procedure

The TPU granulate and the flame retardants are mixed and extruded to obtain the flame retarded thermoplastic polyurethane granulate. Test plates are obtained by injection molding process.

Starting Materials

TPU: Elastollan 1185 A, a thermoplastic polyether-polyurethane elastomer from Elastogran GmbH
Flame retardant 1: resorcinol bis(diphenyl phosphate)
Flame retardant 2: melamine cyanurate
Flame retardant 3: tetraphenyl diphosphinesulfideoxide Properties and flame retardant characteristics of thermoplastic polyurethane according to the invention are shown in Table 3.

TABLE 3

Thermoplastic polyurethane (all quantities are in parts by weight)

|  | Ref. 7 | Ex. 6 |
|---|---|---|
| TPU | 67.5 | 67.5 |
| Flame retardant 1 | 7.5 |  |
| Flame retardant 2 | 25 | 25 |
| Flame retardant 3 |  | 10 |
| UL 94V (2 mm) | V0 | V0 |
| LOI (%) | 23 | 26 |
| Shore A (A) | 84 | 85 |

TABLE 3-continued

Thermoplastic polyurethane (all quantities are in parts by weight)

|  | Ref. 7 | Ex. 6 |
|---|---|---|
| Abrasion (mm$^3$) | 40 | 91 |
| Tear propagation strength (N/mm) | 61 | 43 |
| Tensile strength (MPa) | 32 | 16 |
| Elongation at break (%) | 570 | 540 |
| Tension value 10% (MPa) | 2.70 | 2.17 |
| Tension value 20% (MPa) | 4.37 | 3.50 |
| Tension value 50% (MPa) | 6.90 | 5.57 |
| Tension value 100% (MPa) | 8.2 | 6.4 |
| Tension value 300% (MPa) | 10.9 | 7.5 |

Measurement Methods

UL94V is a flame test according to UL 94 Test for Flammability of Plastic Materials for Parts in Devices and Appliances. V0 rating means an afterflame time<10 s, no burning drips and no burn to clamp.

LOI is the limiting oxygen index measured according to ISO 4589-2:1996. It is the minimum concentration of oxygen in a defined atmosphere required to support combustion of the TPU material.

Shore A strength is determined according to DIN 53505, where the depth of an indentation in the polyurethane material created by a given force on a standardized presser foot is recorded.

Abrasion in terms of mass loss is measured according to DIN ISO 4649-A.

Tear propagation strength is measured according to DIN ISO 34-1Bb.

Tensile strength, elongation at break and tension values are determined according to DIN 53504-S2.

The example in Table 3 demonstrates that halogen-free thermoplastic polyurethanes according to the invention show an excellent flame protection similar or superior to thermoplastic polyurethane containing commercially available flame retardants. In addition, surprisingly the LOI is further improved compared to the reference material.

D Stability of Diphosphine Compounds

The hydrolytic stability of the diphosphine compounds was measured by stirring them in presence of a difunctional alcohol and water (96/4 pbw). The diphosphine compounds were dissolved in the mixture of solvents and then the solution was stirred for 5 minutes at 100° C. After cooling down the percentage of diphosphine compound remaining was measured by spectroscopic means. Table 4 summarizes the results giving the remaining amount of diphosphine compound.

TABLE 4

Hydrolytic stability of diphosphine compounds

5%/not stable

TABLE 4-continued

Hydrolytic stability of diphosphine compounds

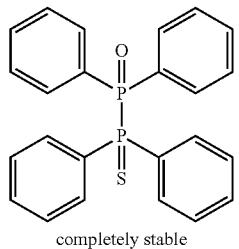

completely stable

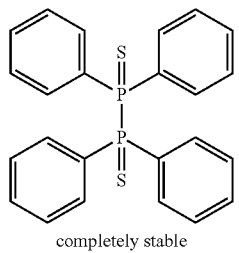

completely stable

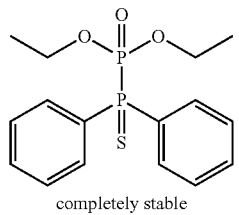

completely stable

The results show that the diphosphine monoxide is not stable in presence of water and alcohol. Surprisingly, the stability significantly increases upon introducing the sulphur by oxidizing the second phosphorous. The stability becomes sufficient for the application of the new diphosphine compounds as flame-retardants in polyurethane materials, especially polyurethane flexible and rigid foams and thermoplastic polyurethane elastomers.

These results in combination with the results from the burning tests clearly show that the halogen-free diphosphine compound based flame retardants described herein are superior to the known diphosphine monoxide compound and similar in performance to the commercially applied halogenated flame retardants.

The invention claimed is:

1. A method for enhancing flame retardance of a polyurethane material, the method comprising: incorporating a diphosphine compound as a flame retardant into the polyurethane material,
wherein the polyurethane material comprises a polyurethane component, a diphosphine compound, optionally a further polymer, and optionally a further additive,
wherein the diphosphine compound is a diphosphine compound of the formula (I):

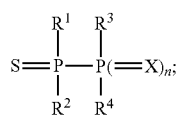

wherein
X is S or O;
n is 0 or 1;

$R^1$, $R^2$, $R^3$, and $R^4$ are each independently $C_1$-$C_{10}$-alkyl, $C_1$-$C_{10}$-hydroxyalkyl, $C_1$-$C_{10}$-alkoxy, $C_1$-$C_{10}$-hydroxyalkoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_4$-alkyl, $C_6$-$C_{10}$-aryl-$C_1$-$C_4$-alkoxy, $C_6$-$C_{10}$-hydroxy-aryl, $C_6$-$C_{10}$-hydroxy-aryloxy, $C_1$-$C_{10}$-thioalkyl, $C_6$-$C_{10}$-thioaryl or $C_1$-$C_4$-thioalkyl-$C_6$-$C_{10}$-aryl, $NR^5R^6$, $COR^2$, $COOR^5$, or $CONR^5R^6$; and $R^5$ and $R^6$ are each independently H, $C_1$-$C_{10}$-alkyl, $C_3$-$C_{10}$-cycloalkyl, $C_6$-$C_{10}$-aryl, or $C_6$-$C_{10}$-aryl-$C_1$-$C_4$-alkyl, wherein a total amount of the diphosphine compound of the formula (I) is from 2 to 15 parts by weight, based on 100 parts by weight of the polyurethane component.

2. The method of claim 1,
wherein X is S or O;
n is 1; and
$R^1$, $R^2$, $R^3$, and $R^4$ are each independently $C_1$-$C_{10}$-alkyl, $C_1$-$C_{10}$-hydroxyalkyl; $C_1$-$C_{10}$-alkoxy, $C_1$-$C_{10}$-hydroxyalkoxy; $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_4$-alkyl, or $C_6$-$C_{10}$-aryl-$C_1$-$C_4$-alkoxy.

3. The method of claim 1, wherein X is S or O;
n is 1;
$R^1$ and $R^2$ are identically $C_1$-$C_{10}$-alkyl, $C_6$-$C_{10}$-aryl, $C_1$-$C_{10}$-alkoxy, or $C_6$-$C_{10}$-aryloxy; and
$R^3$ and $R^4$ are identically $C_1$-$C_{10}$-alkyl, $C_6$-$C_{10}$-aryl, $C_1$-$C_{10}$-alkoxy, or $C_6$-$C_{10}$-aryloxy.

4. The method of claim 1,
wherein X is S or O;
n is 1;
$R^1$ and $R^2$ are identically $C_6$-$C_{10}$-aryl; and
$R^3$ and $R^4$ are $C_6$-$C_{10}$-aryl or $C_1$-$C_{10}$-alkoxy.

5. The method of claim 1, wherein $R^1=R^2$ and $R^3=R^4$.

6. The method of claim 1, wherein $R^1=R^2=R^3=R^4$.

7. The method of claim 1, wherein $R^1$, $R^2$, $R^3$, and $R^4$ are $C_6$-$C_{10}$-aryl.

8. The method of claim 7, wherein $R^1$, $R^2$, $R^3$, and $R^4$ are phenyl.

9. The method of claim 1, wherein the diphosphine is at least one compound selected from the group consisting of:

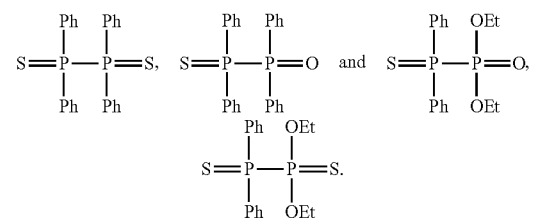

10. The method of claim 1, wherein the diphosphine is liquid at room temperature.

11. The method of claim 1, wherein the diphosphine is soluble in a polyol or isocyanate component of the polyurethane material.

12. The method of claim 1, comprising:
incorporating at least two diphosphine compounds of formula (I).

13. The method of claim 1, further comprising:
incorporating a flame retardant having a different structure from the diphosphine compound, incorporating a synergist, or any combination thereof.

14. A polyurethane material, comprising:
a polyurethane component,
a diphosphine compound, optionally a further polymer, and
optionally a further additive,
wherein the diphosphine compound is a diphosphine compound of the formula (I):

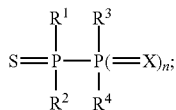

wherein
X is S or O;
n is 0 or 1;
$R^1$, $R^2$, $R^3$, and $R^4$ are each independently $C_1$-$C_{10}$-alkyl, $C_1$-$C_{10}$-hydroxyalkyl, $C_1$-$C_{10}$-alkoxy, $C_1$-$C_{10}$-hydroxyalkoxy, $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_4$-alkyl, $C_6$-$C_{10}$-aryl-$C_1$-$C_4$-alkoxy, $C_6$-$C_{10}$-hydroxy-aryl, $C_6$-$C_{10}$-hydroxy-aryloxy, $C_1$-$C_{10}$-thioalkyl, $C_6$-$C_{10}$-thioaryl or $C_1$-$C_4$-thioalkyl-$C_6$-$C_{10}$-aryl, $NR^5R^6$, $COR^2$, $COOR^5$, or $CONR^5R^6$; and
$R^5$ and $R^6$ are each independently H, $C_1$-$C_{10}$-alkyl, $C_3$-$C_{10}$-cycloalkyl, $C_6$-$C_{10}$-aryl, or $C_6$-$C_{10}$-aryl-$C_1$-$C_4$-alkyl,
wherein a total amount of the diphosphine compound of the formula (I) is from 2 to 15 parts by weight, based on 100 parts by weight of the polyurethane component.

15. The polyurethane material of claim 14, wherein the polyurethane material is a foam.

16. The polyurethane material of claim 15, wherein the polyurethane material is a flexible foam.

17. The polyurethane material of claim 15, wherein the polyurethane material is a rigid foam.

18. The polyurethane material of claim 14, wherein the polyurethane material is a thermoplastic elastomer.

19. The polyurethane material of claim 14, wherein the polyurethane material is a coating.

20. The polyurethane material of claim 14,
wherein the diphosphine compound comprises two or more hydroxyl groups, and
wherein a polymer of the polyurethane material incorporates the diphosphine compound.

21. A mattress; a furniture part; a vehicle, train, or air plane seating; an acoustic insulation in a building or a vehicle; a thermal insulation in a construction element with or without rigid facings; a pipeline; an in-situ spray foam in commercial or domestic refrigeration; an energy absorption foam; a cavity filling foam; an extrusion or injection moulded article; a coating; an adhesive; or a sealant,
comprising:
the polyurethane material of claim 14.

22. The polyurethane material of claim 14,
wherein X is S or O;
n is 1; and
$R^1$, $R^2$, $R^3$, and $R^4$ are each independently $C_1$-$C_{10}$-alkyl, $C_1$-$C_{10}$-hydroxyalkyl; $C_1$-$C_{10}$-alkoxy, $C_1$-$C_{10}$-hydroxyalkoxy; $C_3$-$C_{10}$-cycloalkyl, $C_3$-$C_{10}$-cycloalkoxy, $C_6$-$C_{10}$-aryl, $C_6$-$C_{10}$-aryloxy, $C_6$-$C_{10}$-aryl-$C_1$-$C_4$-alkyl, or $C_6$-$C_{10}$-aryl-$C_1$-$C_4$-alkoxy.

23. The polyurethane material of claim 14,
wherein X is S or O;
n is 1;
$R^1$ and $R^2$ are identically $C_1$-$C_{10}$-alkyl, $C_6$-$C_{10}$-aryl, $C_1$-$C_{10}$-alkoxy, or $C_6$-$C_{10}$-aryloxy; and
$R^3$ and $R^4$ are identically $C_1$-$C_{10}$-alkyl, $C_6$-$C_{10}$-aryl, $C_1$-$C_{10}$-alkoxy, or $C_6$-$C_{10}$-aryloxy.

24. The polyurethane material of claim 14,
wherein X is S or O;
n is 1;
$R^1$ and $R^2$ are identically $C_6$-$C_{10}$-aryl; and
$R^3$ and $R^4$ are identically $C_6$-$C_{10}$-aryl or $C_1$-$C_{10}$-alkoxy.

25. The polyurethane material of claim 14, wherein $R^1$=$R^2$ and $R^3$=$R^4$.

26. The polyurethane material of claim 14, wherein $R^1$=$R^2$=$R^3$=$R^4$.

27. The polyurethane material of claim 14, wherein $R^1$, $R^2$, $R^3$, and $R^4$ are $C_6$-$C_{10}$-aryl.

28. The method of claim 7, wherein $R^1$, $R^2$, $R^3$, and $R^4$ are phenyl.

29. The polyurethane material of claim 14, wherein the diphosphine is at least one compound selected from the group consisting of:

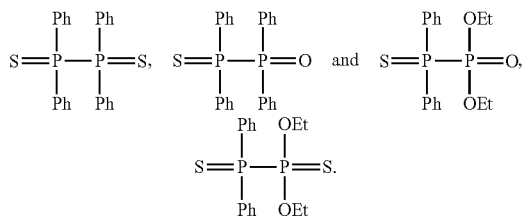

30. The polyurethane material of claim 14, wherein the diphosphine is liquid at room temperature.

31. The polyurethane material of claim 14, wherein the diphosphine is soluble in a polyol or isocyanate component of the polyurethane material.

32. The polyurethane material of claim 14, comprising:
at least two diphosphine compounds of the formula (I).

33. The polyurethane material of claim 14, further comprising:
a flame retardant having a different structure from the structure of the diphosphine compound, a synergist, or a combination thereof.

* * * * *